(12) United States Patent
Ruan (10) Patent No.: US 9,761,885 B2
(45) Date of Patent: Sep. 12, 2017

(54) PLATE-SHAPED CATALYST PRODUCT AND METHOD FOR MANUFACTURING SAME

(76) Inventor: Hai Xiong Ruan, Vancouver (CA)

( * ) Notice: Subject to any disclaimer, the term of this patent is extended or adjusted under 35 U.S.C. 154(b) by 255 days.

(21) Appl. No.: 14/240,064

(22) PCT Filed: Aug. 24, 2012

(86) PCT No.: PCT/CA2012/050590
§ 371 (c)(1),
(2), (4) Date: Feb. 21, 2014

(87) PCT Pub. No.: WO2013/026171
PCT Pub. Date: Feb. 28, 2013

(65) Prior Publication Data
US 2014/0212790 A1    Jul. 31, 2014

Related U.S. Application Data

(60) Provisional application No. 61/526,991, filed on Aug. 24, 2011.

(51) Int. Cl.
| | |
|---|---|
| *H01M 4/88* | (2006.01) |
| *B01J 23/40* | (2006.01) |
| *B01J 23/50* | (2006.01) |
| *H01M 4/90* | (2006.01) |
| *B01J 37/34* | (2006.01) |

(Continued)

(52) U.S. Cl.
CPC .......... *H01M 4/9075* (2013.01); *B01J 23/40* (2013.01); *B01J 23/50* (2013.01); *B01J 35/0013* (2013.01); *B01J 35/0033* (2013.01); *B01J 37/0219* (2013.01); *B01J 37/341* (2013.01); *H01M 4/86* (2013.01); *H01M 4/88* (2013.01); *H01M 4/8842* (2013.01); *H01M 4/8878* (2013.01); *H01M 4/9041* (2013.01); *H01M 4/92* (2013.01); *H01M 4/925* (2013.01); *H01M 4/926* (2013.01); *B01J 35/006* (2013.01); *H01M 4/9083* (2013.01);

(Continued)

(58) Field of Classification Search
CPC ........ H01M 4/9075; B01J 23/40; B01J 23/50; B01J 31/0231; B01J 31/0235; B01J 31/0237; B01J 31/04; B01J 21/063; B01J 21/185; B01J 21/18; B01J 23/16
USPC .......................................................... 429/523
See application file for complete search history.

(56) References Cited

U.S. PATENT DOCUMENTS

| | | | | |
|---|---|---|---|---|
| 5,534,312 A | * | 7/1996 | Hill .................. | C23C 18/14 427/270 |
| 6,458,431 B2 | * | 10/2002 | Hill .................. | C01G 11/02 257/E21.273 |

(Continued)

OTHER PUBLICATIONS

Nagahiro Saito, Junko Hieda, Osamu Takai. "Synthesis process of gold nanoparticles in solution plasma." Thin Solid Films 518 (2009): 912-17.*

(Continued)

*Primary Examiner* — James Lee
(74) *Attorney, Agent, or Firm* — Kyle R. Satterthwaite; Ryan W Dupuis; Ade & Company Inc (57) ABSTRACT

The present disclosure provides a catalyst product having particular three-dimensional plate-like shape and comprising catalyst nanoparticles and a method for manufacturing same. The present product may be useful in fuel cells or battery applications. In certain embodiments the present catalysts show good catalytic activity and durability even at low catalyst loads.

17 Claims, 5 Drawing Sheets

(51) Int. Cl.
   *B01J 37/02*   (2006.01)
   *B01J 35/00*   (2006.01)
   *H01M 4/92*    (2006.01)
   *H01M 4/86*    (2006.01)
   *H01M 8/1018*  (2016.01)

(52) U.S. Cl.
   CPC ............... *H01M 2008/1095* (2013.01); *Y10T 428/2982* (2015.01)

(56) References Cited

U.S. PATENT DOCUMENTS

| | | | | |
|---|---|---|---|---|
| 7,687,428 B1* | 3/2010 | Zhong | ................... | B01J 23/002 429/218.1 |
| 2004/0191423 A1* | 9/2004 | Ruan | ...................... | C23C 18/06 427/554 |
| 2004/0265507 A1* | 12/2004 | Xiong | ................... | C09C 1/0015 427/561 |
| 2005/0209095 A1* | 9/2005 | Brown | ................... | B01J 21/18 502/150 |
| 2010/0086832 A1* | 4/2010 | Lopez | ................... | B22F 1/0018 429/409 |

OTHER PUBLICATIONS

Byungkwon Lim, Jungyo Wang, Pedro H. C. Camargo, Claire M. Cobley, Moon J. Kim, and Younan Xia. "Twin-Induced Growth of Palladiuum-Platinum Alloy Nanocrystals" Angewandte Chemie International Edition 48 (2009): 6304-6308.*

A. Callegari, D. Tonti and M. Chergui. "Photochemically Grown Silver Nanoparticles with Wavelength-Controlled Size and Shape" Nano Letters 3.11 (2003): 1565-568.*

Xianmao Lu, Jingyi Chen, S E Skrabalak and Younan Xia. "Galvanic replacement reaction: a simples and powerful route to hollow and porous metal nanostructures" Proceedings of the Institution of Mechanical Engineers, Part N: Journal of Nanomaterials, Nanoengineering and Nanosystems 221 (2007): 1-16.*

* cited by examiner

PLATE-SHAPED CATALYST PRODUCT AND METHOD FOR MANUFACTURING SAME

This application is the national stage of PCT/CA2012/050590, filed Aug. 24, 2012, and claims benefit under 35 U.S.C. 119(e) of U.S. Provisional Application Ser. No. 61/526,991, filed Aug. 24, 2011.

FIELD

This invention relates generally to catalysts with various composition and structure and in particular to a plate-shaped catalyst product with high catalytic activity at a low loading, and a method for manufacturing same.

BACKGROUND

Polymer electrolyte membrane fuel cell (PEMFC) systems electrochemically react a hydrogen fuel with an oxidant to produce electricity, with the by-product being only heat and water when pure hydrogen is used as the fuel.

It is known to use metal or metal oxide particles as catalysts in fuel cell applications. In a PEMFC it is common to use platinum-based catalysts including carbon supported platinum, and carbon supported platinum alloys with palladium and other metals. Platinum catalysts provide excellent hydrogen electrochemical activity and good durability in a strong acidic media such as polytetrafluoroethylene (PTFE) resin particles, of which the membrane is usually made.

The high cost and price volatility of platinum makes it desirable to minimize its usage in fuel cells. Attempts have been made to form thinner films of platinum on carbon support on the electrodes. By this method it has been possible to reduce the usage of platinum-based particles from about 8 $mg/cm^2$ in 2005 down to about 0.3 $mg/cm^2$ in 2010. In research settings loads of platinum as low as 0.15 $mg/cm^2$ have been achieved on the anode side. However, the loading of platinum on the cathode side is still high, which increases the cost of PEMFC systems.

It is desirable that a catalyst for use in a fuel cell system demonstrate good catalytic activity and durability. Significant electrochemical properties of a catalyst include the specific surface area (active surface area), the structure, the composition, and catalytic activity. Reducing the size of platinum particles below about 4 nanometers showed a reduction in total electrochemical activity even though the smaller size can increase the total surface area. Platinum nanoparticles of around 4 nm or higher are thus considered desirable for use in PEMFC systems.

Typically, the platinum nanoparticles used in PEMFC systems have a spherical or distorted spherical shape. A portion of the particle is not available for catalysis because it is attached to the substrate. Further, certain exposed surfaces of the nanoparticles will not be well utilized because large molecules such as oxygen have a lower probability of accessing the active sites on the surface of spherical nanoparticles when compared to smaller molecules like hydrogen.

In addition, for spherical particles, because most catalytic reactions are surface reactions, the inner part of the spherical particles that consists of the most weight is not utilized at all. Therefore, spherical shape particles for catalyst reaction are not ideal.

A catalytic reaction depends on the large surface areas of the catalyst, the catalytic activity of the catalyst, and reaction conditions. The active sites of the catalysts are particularly important and associated directly to the catalytic activity. It is well documented that more grain boundaries, crystal defects including twins, dislocations, mismatches, and junctions between different elements or different chemical states of the same elements promote catalytic activity of the reaction.

Manipulation of other parameters in a fuel cell system such as air pressure can improve catalytic performance but in general will not completely overcome the intrinsic disadvantages of spherical nanoparticles, because the inner part (non-surface portion) of the nanoparticles remain unutilized despite manipulation of the air pressure. In addition, it can be difficult to enhance the active site of a defined size spherical nanoparticle especially if they are optimized for the processing conditions, such as preparation of platinum nanoparticles by impregnation or thermal reduction means.

Various methods for the production of nanoparticle films are known. For example, U.S. Pat. No. 6,458,431 discloses a method for depositing nanoparticles as an amorphous thin film through a solid state film of precursors from a solution which is deposited on a substrate and converted into a metal or metal oxide film. This method can produce amorphous and some metallic thin films from a solid state film of metal organic complexes in air or under other gas conditions. The shape of the nanoparticles are mostly irregular, some of them are spherical.

US 2004/191423 discloses photoresist-free method for depositing films composed of metal and metal oxide from metal organic complexes. This method can be used to print micron or submicron sized patterns by irradiation of the metal organic complexes in a solid state film. The produced nanoparticles in amorphous form or some in metallic form are packed with pores. The nanoparticles form a thin film with a thickness range from 20 to a few hundreds nanometer.

US 2008/085326 discloses novel antimicrobial materials comprising of polycrystalline nanoparticles of metal, metal oxide, and active oxygen species in a permeable structure, which has nothing related to catalyst on nanosized supports as well.

Accordingly, it is an object of an embodiment of the present invention to provide a nanoparticle catalyst providing improved catalytic activity at a low load.

It is an object of a further embodiment of the invention to provide a method of producing such a nanoparticle catalyst.

Other objects of the invention will be apparent from the description that follows.

SUMMARY

The present disclosure describes plate-shaped catalyst products having various compositions with a structure that provides excellent catalytic activity relative to conventional spherically shaped catalytic particles. The structure of the plate shaped catalyst product is made of smaller particles in homogenous composition or discrete composite fashion, in either a solid or porous form. The smaller particles forming the plate-shaped catalyst product provide many boundaries, edges, and/or terrains that act as active sites for significant enhanced catalytic activity. The present catalyst product may be formed from polycrystalline platinum or platinum-alloy catalyst particles. In certain embodiments the catalyst particles are nanoparticles. The present disclosure further describes methods of making such nanoparticles.

As used herein, the term "nanoparticle" refers to a particle having a maximum diameter of 1000 nm As used herein, the term "plate-shaped catalyst product" refers to a catalyst product comprising a top surface, a bottom surface, and a thickness; the top surface comprising active sites and being relatively flat and the thickness being less than the maximum diameter of the top surface. For example, the thickness may be at least about 25% less, about 30% less, about 40% less, about 50% less, than maximum diameter of the top surface. The catalyst plates may be in any suitable shape such as, for example, circular, elliptical, square, rectangular, wedge, or the like.

According to one aspect of the invention, there is provided a method of manufacturing a plate-shaped catalyst product comprising: selecting precursors of one or more metal organic complexes, each complex comprising a metal ion and an organic ligand wherein at least one of the metal ions when in the resulting catalyst product is catalytic for an intended application; mixing a support material and said metal organic complex precursors in a solution to form a mixture; allowing molecules of the metal organic complex precursor to absorb on the surface of the support material; and irradiating the mixture until each ligand is decomposed from the metal ions and the molecules of the metal organic complexes are converted into one or more metal nanoparticles at least one of which form a catalytic nanoparticle product attached to the support material.

According to another aspect of the invention, there is provided a catalyst product made by the above method.

According to another aspect of the invention, the method can be modified to produce a support loaded with a plate-shaped metal-containing catalyst product by mixing together a support-forming metal organic complex and catalyst-forming metal organic complex(es). Irradiation is used to decompose the metal complexes, and the formed catalyst particles are loaded on the produced support, for example, silver loaded titania nanoparticles. The catalyst particles can be deposited on the surface of the support, or embedded in the support homogeneously.

According to yet another aspect of the invention there is provided a catalyst product comprising catalyst nanoparticles forming a plate shape and a crystalline and/or amorphous structure.

The inventive catalyst product possesses high purity and is generally free of organic and inorganic contaminations. Most conventional methods using impregnation to prepare catalysts on supports are conducted in aqueous solution with different metal salts, acids, and base, surfactants, and other inorganic compounds. To obtain a high purity catalyst on a support using conventional methods is very difficult and normally involves many steps of washing and post-purification. The present method according to an aspect of the invention uses high purity metal organic complexes in crystalline form to be dissolved in volatile organic solvents. The specific chosen organic ligands will degenerate to other volatile fragments, which can be easily removed by centrifuging, separation, rinsing with organic solvent(s), and evaporation under vacuum with/without low temperature heating. This will result in only the metal containing catalyst being deposited on the chosen or prepared support. It is apparent that the high purity of the innovative catalysts shall possess better catalytic activity than those catalysts having some residue of contaminations.

This summary does not necessarily describe all features of the invention. Other aspects, features and advantages of the invention will be apparent to those of ordinary skill in the art upon review of the following description of specific embodiments of the invention.

DETAILED DESCRIPTION

The embodiments described herein relate to a catalyst product having various compositions and structures in a polycrystalline or amorphous form or both with a plate-like shape, and a method of manufacturing such a catalyst product. Certain embodiments relates to a catalyst product having catalyst nanoparticles that are particularly useful in fuel cell and battery applications.

While not wishing to be bound by theory it is believed that, when compared to a spherically-shaped catalyst product comprising catalyst nanoparticles, a catalyst product having a plate shape and morphology possesses a significant advantage in terms of the surface area and active sites availability for catalysis. For example, assuming one third of a spherical catalyst product is in contact with a catalyst support, the usable surface area of a spherical product is half or less of that of a circular plate-shaped product having an equivalent mass. Embodiments of the present plate-shaped catalyst product have an average span of from about a few nanometers to about 15 nanometers which, depending on the thickness, corresponds to accessible surface areas 123% to 1100% greater than that of a spherical catalyst product with the same mass, wherein "average span" means the averaged dimension across the major surface of the catalyst particle—for a circular plate shaped particle the average span is the diameter. It is apparent that the structure of the present catalyst product provides greater accessibility of molecules to the active sites. This can lead to significantly enhanced electrochemical activity at a lower level of loading of platinum-based catalysts.

Figure 1A:
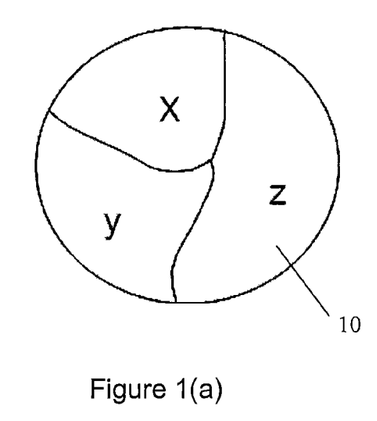
FIG. 1(a) is a schematic plan view of a polycrystalline plate-shaped catalyst product having multiple compositions "X", "Y" and "Z" according to one embodiment.
Figure 1B:
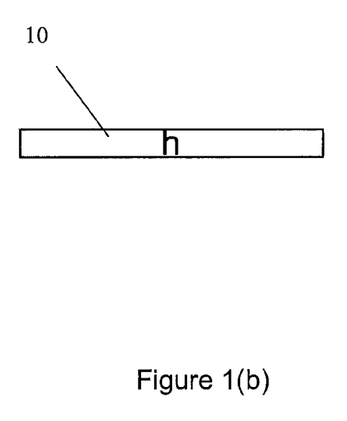
FIG. 1(b) is a schematic side elevation view of the catalyst product.

Referring now to FIGS. 1(a) and (b), and according to a first embodiment, a catalyst product 10 comprising catalyst nanoparticles ("catalyst nanoparticle product") can be manufactured having a polycrystalline and/or amorphous structure, plate-like shape, and having a composition of one or more metals and their alloys. The produced nanocrystallines are schematically represented in FIG. 1(a) as forming a region of the product labelled as "X", "Y", and "Z", although in reality the physical microstructure may be quite different in appearance. These regions can be the same material to form a single crystalline nanoparticle, or the same metal oriented in different directions to form a polycrystalline nanoparticle; or the same metal with different oxidation states to form a nano-grain; or different metals and/or metal oxides to form a polycrystalline nanoparticle. Most individual plate-like particles are made of many smaller particles that forms boundaries, edges, and/or terrains, which are not shown in the FIG. 1. The composition of the product 10 also can be homogeneous or comprise multiple metals.

The catalyst product 10 can comprise polycrystalline catalytic nanoparticles such as platinum or platinum-alloys or other metal composition(s), and is attached to a catalyst support structure. A method of manufacturing such a catalyst particle is described generally as follows:

(a) obtaining selected precursors, either by preparing them or purchasing commercially available products, the prepared precursors being of one or more metal organic complexes comprising a metal centre and at least one type of organic ligand wherein at least one of the metals in the product form is catalytic for an intended application and wherein the metal organic complexes have the same or similar organic ligand(s); alternatively, a combination of different ligands on the same metal centre also can be used for this purpose.

(b) dissolving the selected metal complex precursors in an organic solvent to form a clear precursor solution;

(c) mixing a non-soluble support material into a selected organic solvent until the support material is homogenized in the solvent to form a support material solution; for example, by way of ultrasonication or the like. Preferably, the selected organic solvent is identical or similar to that used in step a;

(d) mixing the precursor solution and the support material solution to form a mixed solution and stirring for a period of time to allow the metal organic complex molecules to absorb on the surface of the support material;

(e) irradiating the mixed solution, preferably in a sealed container, for a desired time with periodic shaking of the mixed solution. Repeating this procedure of irradiation (and shaking) of the metal organic complex(es) molecules until the ligands are decomposed from the centres of the metal ions, thereby converting the metal organic complex molecules into metal or metal oxide nanoparticles at least some of which are the electrochemically active catalytic nanoparticle product; and the fragments of the organic ligands are all soluble in the solvent; and (f) separate the prepared catalyst product from the mixed solution, thereby removing the fragment of organic ligands and solvent by centrifuging, separation, washing, and/or evaporation. Preferably this involves washing the solid with pure solvent or a mixture of pure solvents for at least five times.

The method preferably further includes a post-heat treatment under vacuum for a selected period of time to remove volatile organic residuals from the catalyst nanoparticle product 10. Alternatively, the post-heat treatment can be processed under different atmospheric conditions than a vacuum, including under nitrogen or a reducing gas like hydrogen to prevent further oxidation, or a combination of them.

Suitable metal ions for the metal organic complex precursor include, but are not limited to: titanium, chromium, manganese, iron, copper, nickel, cobalt, yttrium, zirconium, niobium, molybdenum, ruthenium, rhodium, palladium, silver, indium, tin, barium, hafnium, tantalum, tungsten, rhenium, osmium, iridium, platinum, gold, lead, bismuth, lanthanum, samarium, including combinations or alloys thereof. Any suitable metal oxide may be used herein, including but not limited, to the listed metal oxides in their various oxidation states. The selection of the metal alloys include, but are not limited to binary, ternary, or quaternary compounds. Depending on the selection of the metal(s), the structure of related oxide(s) may be crystalline or amorphous.

At least one of the selected metal should be a catalytic material for the intended application, e.g. platinum can be selected as a catalytic material for a PEMFC application.

Preferably, the organic ligand selected is volatile, easily dissolvable in organic solvent, does not form polymers when irradiated, has a low boiling point for easy evaporation, and the fragments of which do not react or absorb easily with the support or metal. Suitable organic ligands include, but are not limited to: carboxylato, acac, fluorinated acac, alkoxy, azide, carbonyl, nitrato, amine, halide, nitro, and combinations thereof.

Preferably, photosensitive metal complexes are used to form the present catalysts. In certain embodiments, using volatile and/or photosensitive and/or thermal sensitive organic ligands to chelate the metal ions will produce catalyst particles of high purity. These ligands undergo fragmentation under conditional irradiation.

Any suitable support material can be used herein as would be known to one skilled in the art, whether commercially available or prepared onsite. Examples include carbon black, graphite, titanium dioxide, carbon nanotubes, nanowire, nanofiber, or other suitable inert materials, which do not decompose or react with the metal organic complexes to form other products prior to forming the intended catalytic nanoparticle under irradiation. A combination of materials may be used. The shape of the support may be, for example, spherical, irregular spherical, thin plates, solid or a porous structure. Preferably the substrates do not react with the precursors that produce the present catalysts to form precipitates. In addition, a support with a limited amount of subnanometer sized pores on the surface may be suitable for production of intended catalysts.

Suitable solvents are organic polar solvents, which include but are not limited to methanol, ethanol, 2-propanol, hexane, hexanes, chloroform, dichloromethane or combinations thereof. In this embodiment, at least one of the solvents comprises an alcohol.

Irradiation is accomplished using irradiation means suitable for decomposing the metal organic precursor complex; for example, ultraviolet light, a laser, high energy beams, microwaves or the like.

Figure 4:
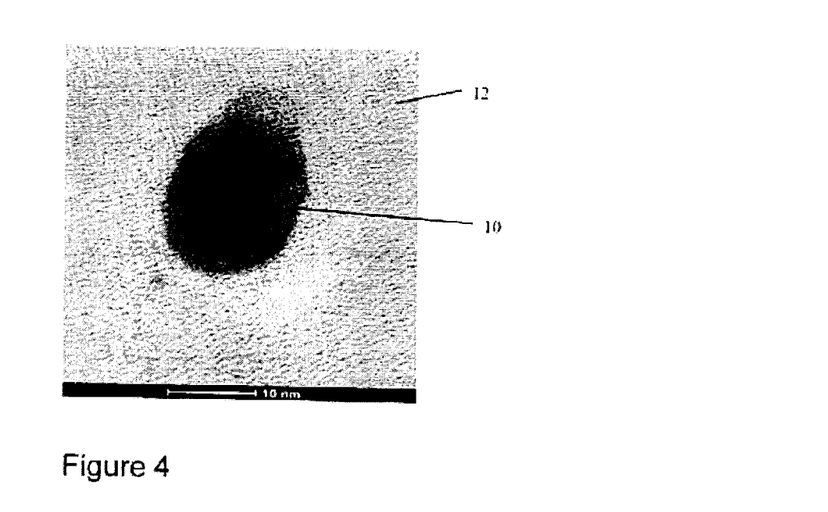
FIG. 4 is a high resolution transmission electron microscopy (HRTEM) image of a plate-shaped platinum catalyst product on a XC-72R carbon support.
Figure 5:
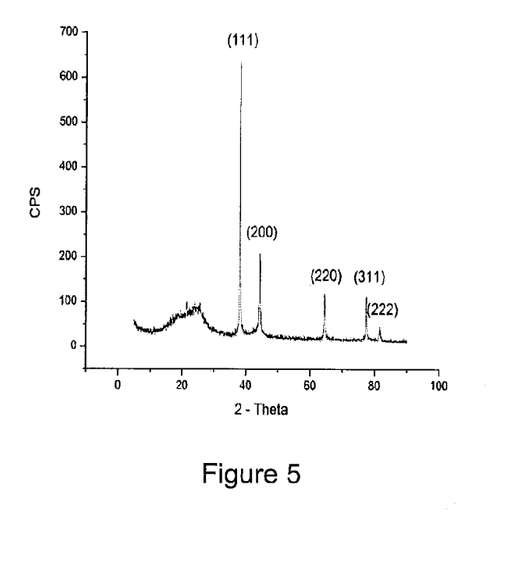
FIG. 5 is a graph of an XRD pattern of catalyst product particles comprising silver on XC-72R carbon support.

The present described method can make high purity catalysts comprising metals and/or metal alloys such as platinum and platinum alloys. FIG. 4 and Example 1 below illustrates an actual platinum catalyst nanoparticle product 10 attached to a carbon support structure 12 that was manufactured by the present described method. As can be seen in FIG. 4, the catalyst nanoparticle product 10 has a polycrystalline structure with a somewhat irregular circular plate-like shape. The polycrystalline nature of the catalyst nanoparticle product 10 is confirmed by the multiple peaks shown in the XRD pattern of the graph shown in FIG. 5.

Due to the high purity of the metal complexes and the complete fragmentation of the organic ligand from the metal centre, the produced metal or metal oxides can be substantially free of contamination. In particular, the produced metal or metal oxides are free of residual ions such as sodium, potassium, sulfate, or nitrate, or other non-volatile organic ligands that are used in aqueous solution of most impregnation methods to prepare nano-catalysts, which can affect the catalyst performance and long-term durability.

Catalytic nanoparticle product 10 of the present embodiment can have a diameter of from about 1 nm to about 1000 nm, about 1 nm to about 500 nm, about 1 nm to about 100 nm. The catalyst nanoparticle product 10 can be porous and possess crystallographic defects including stacking falls, dislocations, twins, vacancies, and/or lattice mismatches. Most of these crystalline defects are thought to be rich of active sites. Furthermore, defects located on the surfaces of the catalyst nanoparticle product 10 may provide greater accessibility as well as reaction activity on the catalyst particle's surface. Porous plate-shaped nanoparticles offer the apparent advantage of increasing the surface area as well as active sites that are commonly known to enhance catalytic activity.

Compared to conventional spherical nanoparticles, the present plate-shaped nanoparticle product 10 is expected to be able to attract or release molecules more easily from their surface. Spherical nanoparticles absorbed on the support surface are difficult for gas molecules to access at certain angles reducing the amount of active sites available.

In the present embodiment, the catalyst nanoparticle product 10 is attached to the support 12 by employing a surface/interface reaction method to decompose metal organic compounds and deposit the catalyst particles directly on the support surface. The potential chemical bonds formed between the nanoparticles and the substrate immobilize the particles on the support. While not wishing to be bound by theory, it is believed that this method avoids aggregation of particles that tend to occur during a conventional impregnation deposition process. It is thought that most catalytic reactions occur on the surface of the catalysts, therefore the cleavage of this bonding between the nanoparticles and the support material by catalytic reaction is unlikely. Furthermore, due to the large contacting surface area of the catalyst nanoparticle product 10 with the support material 12, it is thought that the bonding between the nanoparticle product 10 and the support material 12 is much stronger than the bonding between an absorbed spherical nanoparticle which has a much reduced contacted surface area of the support.

The present nanoparticle plates that are formed generally have a circular shape; however, other shapes can be formed. In certain embodiments the present catalyst nanoparticle product 10 is a relatively uniform circular shape ranging from about 2 to about 50 nanometers in diameter. The dominant size distribution may be in a range between about 3 and about 25 nanometers. The thickness is preferably about 10 nm or less, about 4 nm or less, about 2 nm or less.

The catalyst nanoparticle product 10 of the present embodiment can be an alloy (single polycrystalline composition) or nanocomposite form (multiple polycrystalline compositions), such as: Pt-Palladium catalyst, $Pt$—$PtO_2$ catalyst, or Pt—Ru catalyst, or Pt—Pd—$TiO_2$ catalyst in a nanocomposite form. The present catalysts may differ from those commonly used commercially in terms of their structure and/or shape. The present catalysts typically do not form a core-shell structure nor a spherical shape. The present polycrystalline nanoparticles may be co-deposited and form smooth boundaries and surfaces. The deposition may be such that the majority of particles present their active sites such that catalytic activity is enhanced.

If it is desired to prepare nanocomposite catalysts with different metals it is generally preferred to use the same or similar organic ligands chelated with different metal centres. Different metal organic complexes should be selected to avoid their reacting and forming a precipitate after mixing in the organic solvent(s).

Figure 2:
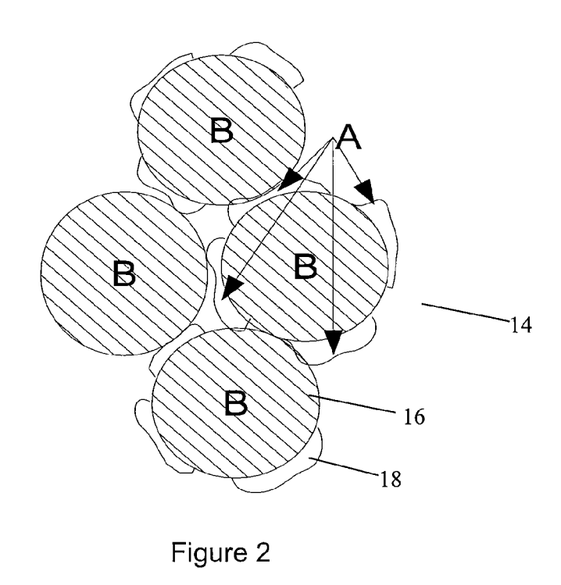
FIG. 2 is a schematic illustration of a porous catalyst product comprising a first catalyst material surrounded by a second catalyst material, according to another embodiment.

According to a second embodiment and referring to FIG. 2 there is disclosed a plate-shaped catalyst nanoparticle product 14 comprising two different types of nanoparticles that together form a porous microstructure, herein referred to as a first nanoparticle 16 and a second nanoparticle 18. The first nanoparticle 16 is labelled as B in FIG. 2 and is pre-deposited onto a support material (not shown) and forms a plate shape; the second nanoparticle 18 is labelled as A and is deposited subsequently around the pre-deposited first nanoparticle 16 to form a "gear like" shape around the first nanoparticle 16.

In order to form this two-nanoparticle gear-shaped structure, the two metal precursors are selected to have distinctly different photo-sensitivities, and the method is modified to include two irradiation steps each at a different wavelength (and possibly also a different time). This allows the first nanoparticle 16 to form on the support material first, while the ligand decomposition of the second metal organic complex precursor is still at a minimum or negligible decomposition rate. Once the first nanoparticle 16 has formed on the support material (i.e. after the first irradiation and stirring step has decomposed the ligand of this first metal organic complex precursor), the second irradiation step can be applied to form the second nanoparticle 18 around the pre-deposited first nanoparticle 16.

By controlling the molar ratio or the ligands of metal organic complexes to control the amount of the subsequent metal nanoparticle formation, an add-on structure with a gear-type shape can be created as shown in FIG. 2. It is also believed that with a certain selected amount of the second metal organic complex(es), that the second subsequently deposited nanoparticle 18 can be deposited on top of the first nanoparticle 16 in partial or full coverage.

Figure 3:
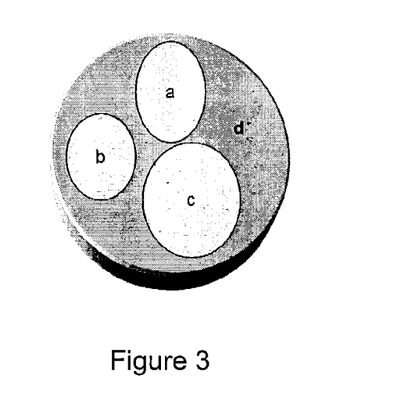
FIG. 3 is a schematic plan view of a plate-shaped catalyst product comprising a support structure with multiple different catalyst materials attached thereto, according to another embodiment.

Referring now to FIG. 3, the method of the second embodiment can be modified by controlling the processing conditions and selection of metal complexes and their related contents in the solution, to produce a plate-shaped catalyst nanoparticle product 20 having a structure of one or more different types metal nanoparticles (shown as a, b, and c in FIG. 3) which are embedded in a support composed of another type of metal nanoparticles (shown as d in FIG. 3). The different metals can be formed through a co-deposition process.

The metal of the second metal organic complex precursor will prefer to absorb on the pre-deposited first metal nanoparticle 16 because of a better attraction force difference between the metal and the organic ligand compared to that between a carbon support material (not shown) and the same organic ligand.

The nanoparticle structure of this embodiment is expected to be particularly advantageous as the many edges, faces and boundaries creates additional active sites by increasing the active surface area especially of the second metal nanoparticle 18. In other words, this type of structure will advantageously expose the most active sites to the reactants while the other functional metal or metal oxide are at closest length with minimum loading, like Pd to enhance the electrochemical activity of Pt for oxygen reduction. In a PEMFC application, this porous structure allows reactant molecules to access active sites in the porous structure.

EXAMPLES

The present invention will be further illustrated in the following examples. However it is to be understood that these examples are for illustrative purposes only, and should not be used to limit the scope of the present invention in any manner.

Example 1: Preparation of Pt Nanoplates on Carbon Support

A platinum(II) trifluoroacetylacetonate complex precursor was dissolved in dichloromethane. A Cabot XC-72R carbon support material with five times of mass equivalent of platinum was homogenized in ethanol solution before the platinum complex solution was added. The solution was stirred at room temperature with aluminium foil cover for an hour. This solution was poured into a flat bottom container to form a thin layer. A quartz plate was placed on the top of the container and a UV lamp with a filter irradiated the solution for a period of time depending on the concentration of the photo-sensitivity of the metal complex. A periodic shaking of the solution was applied during the process. When the reaction was completed, the solid was centrifuged, washed with pure solvent multiple times, and dried in a vacuum furnace for one hour at 60° C. to remove residual organic compounds including the trace solvent absorbed on the surface of the carbon support.

Figure 6:
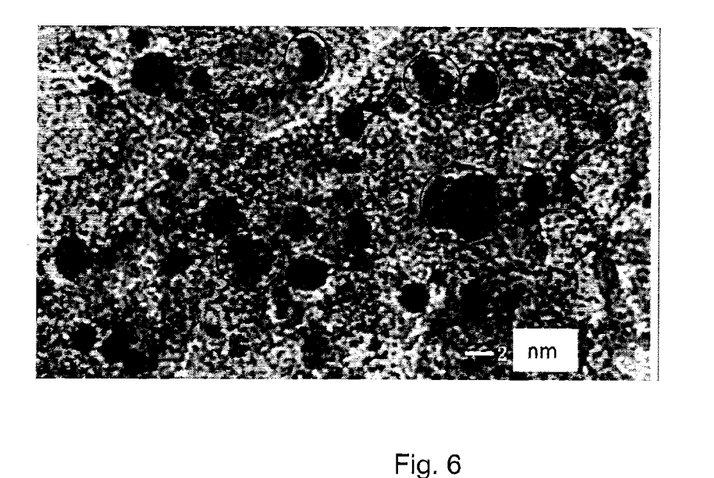
FIG. 6 is a High Resolution Transmission image of the nanoplates of the present invention on a carbon support. The right panel illustrate when two lights in disc shape interact with each other to form an intersection or intersections. As Platinum is a heavy metal, even distribution of the grey area is a clear indication of uniform thickness of nanoparticle.
Figure 7:
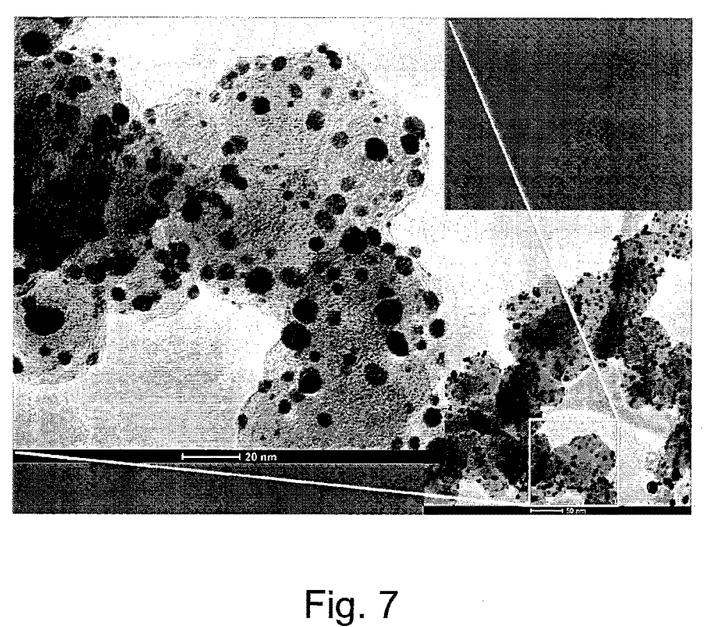
FIG. 7 is a further High Resolution Transmission Image of a support material with the plate-shaped nanocatalyst of the present invention showing uniform distribution of the nanoparticles.
Figure 8:
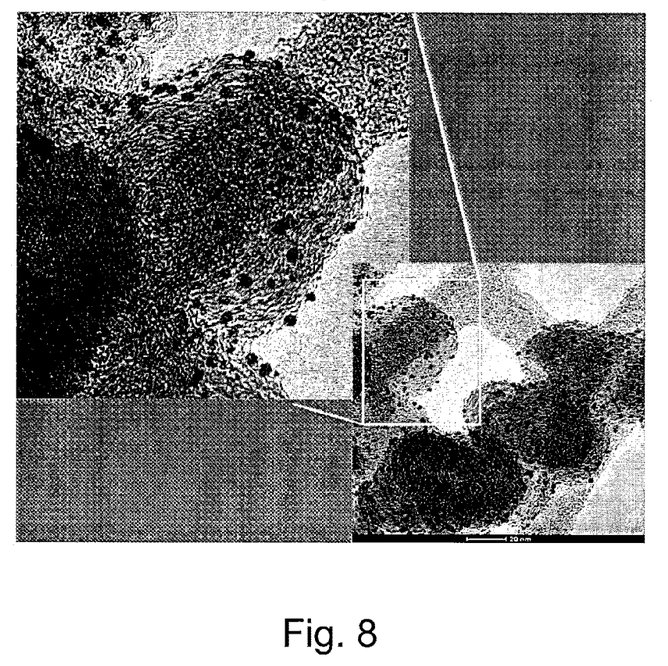
FIG. 8 is a further High Resolution Transmission Image of showing the distribution of the nanoparticles on a carbon support.

High resolution transmission electron microscopy images, such as that shown in FIG. 4, showed that the prepared platinum nanoparticles had a circular plate-like shape and were deposited on the carbon support uniformly (as shown in FIGS. 6 and 7). The percentage of the particles ranging from 3-5 nm was over 90%. The different orientations of the lattice fringes showed that the platinum nanoparticles are polycrystalline.

Example 2: Preparation of Ag—TiO$_2$ Nanoplates on Carbon Support

A Silver(I) trifluoroacetylacetonate complex and a Titanium(IV) bis(isopropanoxyl)bis(acetyleacetonate) complex precursor were each dissolved in absolute ethanol. A Cabot XC-72R carbon support material with five times of mass equivalent of the silver complex precursor was homogenized in ethanol solution before the two metal complex precursors were added. The solution was stirred at room temperature with aluminum foil cover for a period of time to ensure the best absorption of the metal complexes on the support. This solution was poured into a flat bottom container to form a thin layer. A quartz plate was placed on the top of the container and a UV lamp with a filter irradiated the solution over a period of time depending on the concentration of the metal complexes. A periodic shaking of the solution was applied during the whole process. The solid was centrifuged, washed with pure solvent multiple times, and dried in a vacuum furnace at a temperature between 50-70° C. to remove all residual organic compounds including trace solvent absorbed on the surface of the carbon support.

High resolution transmission electron microscopy images showed that the prepared silver nanoparticles had a circular plate-like shape and were deposited on the carbon support. The TiO$_2$ can be seen as an amorphous deposit, which no fringes visible. The different orientations of the lattice fringes showed that the silver nanoparticles had a polycrystalline structure. By indexing the lattice fringes, silver and mixed silver(II) oxide were identified.

The X-ray diffraction pattern of the prepared catalyst indicated that the silver was polycrystalline silver. Silver oxide peaks were not observed possibly due to the limitations of the detection method.

Example 3: Preparation of a Bimetallic Nano-Catalyst with Plate Like Shape

A first metal organic complex precursor of Palladium(II) trifluoroacetylacetonate was dissolved in an dichloromethane to form a solution. A support material of XC-72R carbon black at a five times of mass equivalent of palladium homogenized in alcohol was added into the solution to form a mixture. The mixture was stirred until homogeneously mixed. A second metal organic complex precursor of Pt(II) trifluoroacetylacetonate, in an amount that is half of equivalent moles of the palladium precursor, was added to the mixture. The solution was poured into a quartz glass box and covered with a quartz plate. The solution then was irradiated over a period of time until all the metal complexes were decomposed. A periodic shaking was applied during the whole process. Due to the amount of the metal complexes, the irradiation time can last from several hours to a few days. The resulting solution was centrifuged, washed with pure solvent multiple times, and dried under vacuum. The obtained catalyst was further dried under line vacuum at 200 degrees Celsius for two hours before electrochemical measurement.

Energy dispersion x-ray mapping of the prepared bimetallic nanocatalysts was conducted. It showed that the prepared catalyst comprises of individual Pt nanoparticles, Pd nanoparticles, and Pt—Pd alloy nanoparticles with most in the size range of 4-6 nm.

Figure 9:
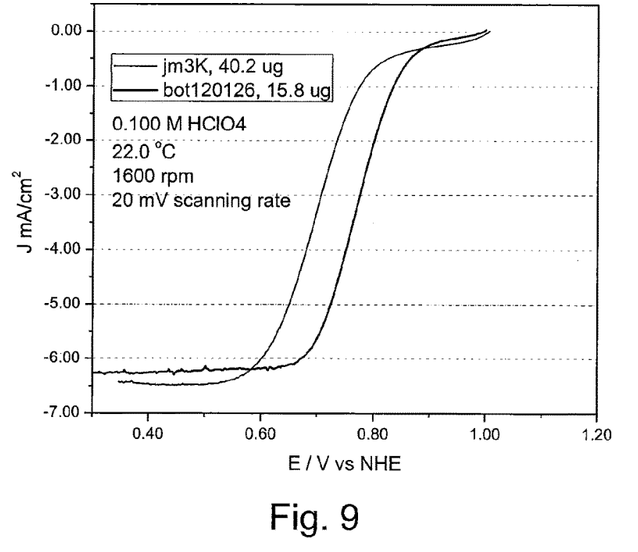
FIG. 9 is a cyclic voltammetry diagram comparing results obtained using an embodiment of the present invention versus a commercial catalyst tested under identical conditions. The catalyst of the present invention showed excellent electrocatalytic activity similar to the commercial product, but with an approximately 60% reduction of loading of the platinum.
Figure 10:
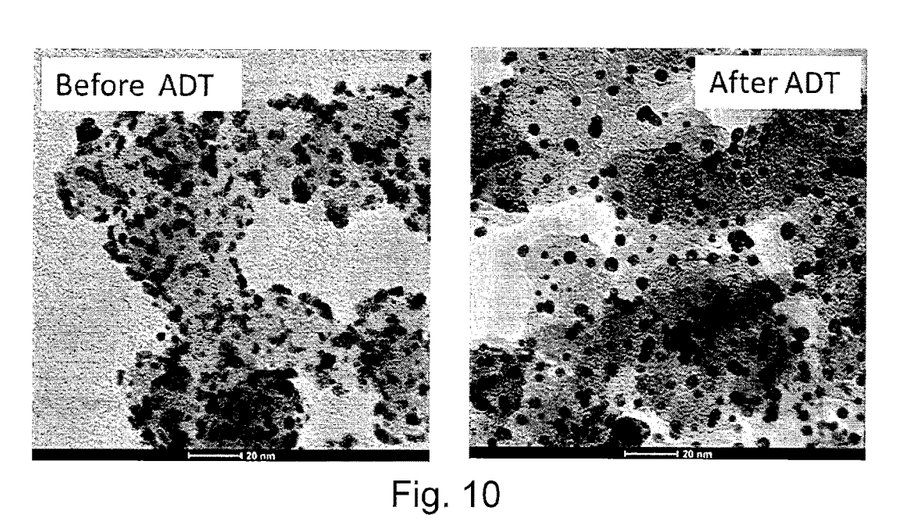
FIG. 10 shows a pair of High Resolution Transmission images of a catalyst of the present invention before (left) and after (right) an Accelerated Degeneration Test Protocol after 12 hours continued scanning at 50 mV/sec rate. It is apparent after such stressful test, that the said catalyst remained on the surface of the support under excellent condition. The uniform distribution and size of the nanoparticles showed a negligible aggregation or redistribution, which are significant factors which affect the durability of the cell performance and lifetime.

The cyclic voltammetry diagram shown in FIG. 9 shows that the prepared catalyst on glassy carbon electrode (bot120126) had excellent electrochemical activity for oxygen reduction in 0.1 M perchloric acid solution.

The TGA data indicated that the percentage of the metal content was 11.5% of the product, which was in agreement with the result obtained from Energy Dispersion X-ray measurement within error.

It is contemplated that any embodiment discussed in this specification can be implemented or combined with respect to any other embodiment, method, composition or aspect of the invention, and vice versa.

All citations are herein incorporated by reference, as if each individual publication was specifically and individually indicated to be incorporated by reference herein and as though it were fully set forth herein. Citation of references herein is not to be construed nor considered as an admission that such references are prior art to the present invention.

The invention includes all embodiments, modifications and variations substantially as hereinbefore described and with reference to the examples and figures. It will be apparent to persons skilled in the art that a number of variations and modifications can be made without departing from the scope of the invention as defined in the claims. Examples of such modifications include the substitution of known equivalents for any aspect of the invention in order to achieve the same result in substantially the same way.

What is claimed is:

1. A method of manufacturing a catalyst product comprising:
    (a) selecting precursors of one or more radiation sensitive metal organic complexes, each complex comprising a metal ion and an organic ligand wherein at least one of the one or more metal ions when in the resulting catalyst product is catalytic;
    (b) mixing a nano-sized support material and said precursors of the one or more metal organic complexes in an organic solvent to form a mixture;
    (c) allowing molecules of the precursors of the one or more metal organic complexes to adsorb on the surface of the support material to form a layer;
    (d) irradiating the mixture until all adsorbed molecules of said precursors of the one or more metal organic complexes are converted into one or more metal-containing nanoparticles through a surface chemical reaction, and at least one of the metal-containing nanoparticles forms a catalytic nanoparticle product attached to the support material and having a plate-shaped structure.

2. A method as claimed in claim 1 further comprising separating the nanoparticle product from the mixture, wherein said separating is accomplished by at least one of centrifuging, washing, and evaporation.

3. A method as claimed in claim 2 further comprising heating the at least one metal-containing nanoparticle in an inert atmosphere to remove volatile organic residuals from the at least one metal-containing nanoparticle.

4. A method as claimed in claim 1 comprising a further step of pre-mixing said support material in a selected organic solvent until homogenized prior to mixing with said precursors of the one or more metal organic complexes.

5. A method as claimed in claim 1 further comprising periodically shaking the mixture during step (d).

6. A method as claimed in claim 1 wherein the one or more metal ions are selected from the group consisting of: titanium, chromium, manganese, iron, copper, nickel, cobalt, yttrium, zirconium, niobium, molybdenum, ruthenium, rhodium, palladium, silver, indium, tin, barium, hafnium, tantalum, rhenium, osmium, iridium, platinum, gold, lead, bismuth, lanthanum, samarium, and combinations or alloys or metal oxides thereof.

7. A method as claimed in claim 1 wherein the one or more ligands are selected from the group consisting of: carboxylato, acac, fluoronated acac, alkoxy, azide, carbonyl, nitrato, amine, halide, nitro, and combinations thereof.

8. A method as claimed in claim 1 wherein the support material is selected from the group consisting of: carbon black, graphite, titanium dioxide, carbon nanotube, nanowire, nanofiber and a combination thereof.

9. A method as claimed in claim 1 wherein the solvent is selected from the group consisting of: methanol, ethanol, 2-propanol, hexane, hexanes, chloroform, dichloromethane or combinations thereof.

10. A method as claimed in claim 1, wherein step (d) is accomplished by an irradiation source.

11. A method as claimed in claim 1 comprising a further step of dissolving said precursors of the one or more metal organic complexes in the organic solvent prior to mixing with said support material.

12. A method as claimed in claim 10 wherein said irradiation source comprises at least one of ultraviolet light, laser light, high energy beams, and microwaves.

13. A supported catalyst nanoparticle product produced by the method in claim 1, said supported catalyst nanoparticle product having a polycrystalline structure and a plate-shape comprising a top surface, a bottom surface, and a thickness, said thickness being less than the maximal diameter of said top surface, wherein the top surface has a maximum diameter of from about 2 to about 25 nm, and at least some of the metal-containing nanoparticles are porous.

14. A supported catalyst nanoparticle product as claimed in claim 13 comprising a catalyst nanoparticle selected from the group consisting of titanium, chromium, manganese, iron, copper, nickel, cobalt, yttrium, zirconium, niobium, molybdenum, ruthenium, rhodium, palladium, silver, indium, tin, barium, hafnium, tantalum, rhenium, osmium, iridium, platinum, gold, lead, bismuth, lanthanum, samarium, and combinations or alloys thereof.

15. The supported catalyst nanoparticle product of claim 13 further comprising crystallographic defects, said crystallographic defects comprising at least one of stacking falls, dislocations, twins, vacancies, and lattice mismatches.

16. A supported catalyst nanoparticle product as claimed in claim 13 wherein the supported catalyst nanoparticle product comprises polycrystalline platinum or platinum alloys.

17. A supported catalyst nanoparticle product as claimed in claim 13 wherein the support material comprises one or more of carbon black, graphite, and titanium dioxide.

* * * * *